United States Patent
Koshelev

(10) Patent No.: US 9,253,208 B1
(45) Date of Patent: Feb. 2, 2016

(54) SYSTEM AND METHOD FOR AUTOMATED PHISHING DETECTION RULE EVOLUTION

(71) Applicant: Kaspersky Lab ZAO, Moscow (RU)

(72) Inventor: Maxim G. Koshelev, Krasnoyarsk (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/639,871

(22) Filed: Mar. 5, 2015

(51) Int. Cl.
*H04L 29/00* (2006.01)
*H04L 29/06* (2006.01)
*G06F 17/30* (2006.01)
*G06F 21/56* (2013.01)
*G06F 21/55* (2013.01)

(52) U.S. Cl.
CPC ...... *H04L 63/1483* (2013.01); *G06F 17/30598* (2013.01); *G06F 21/566* (2013.01); *H04L 63/0227* (2013.01); *H04L 63/0236* (2013.01); *H04L 63/0245* (2013.01); *H04L 63/0263* (2013.01); *H04L 63/14* (2013.01); *H04L 63/1441* (2013.01); *G06F 21/55* (2013.01); *H04L 63/20* (2013.01)

(58) Field of Classification Search
CPC ......... H04L 63/02; H04L 63/12; H04L 63/14; H04L 63/16; H04L 63/20; G06F 21/05; G06F 2221/2119
USPC ...................... 726/1, 11–15, 22–25
See application file for complete search history.

(56) References Cited

U.S. PATENT DOCUMENTS

| | | | |
|---|---|---|---|
| 7,854,001 B1 | 12/2010 | Chen et al. | |
| 7,925,883 B2 | 4/2011 | Florencio et al. | |
| 8,055,601 B2 | 11/2011 | Pandya | |
| 8,296,664 B2 | 10/2012 | Dixon et al. | |
| 8,578,166 B2 | 11/2013 | De Monseignat et al. | |
| 8,621,616 B2 | 12/2013 | Zhang et al. | |
| 8,627,458 B2 * | 1/2014 | Muttik | 726/22 |
| 8,671,447 B2 | 3/2014 | Eikenberry et al. | |
| 8,707,426 B1 | 4/2014 | Ramzan et al. | |
| 8,826,155 B2 | 9/2014 | Dixon et al. | |
| 2007/0005984 A1 | 1/2007 | Florencio et al. | |

(Continued)

FOREIGN PATENT DOCUMENTS

| | | |
|---|---|---|
| EP | 1863240 B1 | 8/2010 |
| JP | 2012521599 A | 9/2012 |

(Continued)

OTHER PUBLICATIONS

Fette, Ian, Norman Sadeh, and Anthony Tomasic. "Learning to detect phishing emails." Proceedings of the 16th international conference on World Wide Web. ACM, 2007.*

(Continued)

*Primary Examiner* — Madhuri Herzog
(74) *Attorney, Agent, or Firm* — Patterson Thuente Pedersen, P.A.

(57) ABSTRACT

System and method for automatically developing phishing detection rules. Based on detected phishing indicia, a quantitative score is computed for each of a plurality of predefined parameters, with each of the parameters relating to at least one of the phishing indicia. A requirement for evolving a phishing detection rule is assessed, and a new phishing detection rule is generated based on selected parameter scores meeting the rule evolution criteria and on corresponding content of the phishing indicia relating to those selected parameter scores. New phishing detection rules are applied recursively to detect phishing indicia, and more new rules can be further evolved in recursive fashion.

28 Claims, 8 Drawing Sheets

(56) References Cited

U.S. PATENT DOCUMENTS

| | | | |
|---|---|---|---|
| 2007/0112824 A1* | 5/2007 | Lock | G06N 5/025 |
| 2007/0261112 A1* | 11/2007 | Todd et al. | 726/11 |
| 2009/0089859 A1 | 4/2009 | Cook et al. | |
| 2010/0235918 A1* | 9/2010 | Mizrahi et al. | 726/25 |
| 2010/0251380 A1 | 9/2010 | Zhang et al. | |
| 2010/0281536 A1 | 11/2010 | Richards et al. | |
| 2010/0332593 A1 | 12/2010 | Barash et al. | |
| 2012/0158626 A1 | 6/2012 | Zhu et al. | |
| 2013/0031628 A1 | 1/2013 | Wang et al. | |
| 2013/0145418 A1* | 6/2013 | Stein | H04L 63/20 726/1 |
| 2014/0033307 A1 | 1/2014 | Schmidtler | |
| 2014/0150082 A1 | 5/2014 | Eikenberry et al. | |
| 2014/0317741 A1* | 10/2014 | Be'ery et al. | 726/23 |

FOREIGN PATENT DOCUMENTS

| | | |
|---|---|---|
| RU | 2446459 | 3/2012 |
| WO | WO2007070838 | 7/2008 |

OTHER PUBLICATIONS

Barraclough, P. A., et al. "Intelligent phishing detection and protection scheme for online transactions." Expert Systems with Applications 40.11 (2013): 4697-4706.*

Russian Search Report for Russian Application No. 2014141809/08 (067693) dated Oct. 17, 2014. English Translation not available.

* cited by examiner

SYSTEM AND METHOD FOR AUTOMATED PHISHING DETECTION RULE EVOLUTION

FIELD OF THE INVENTION

This invention relates to the field of information security and, particularly, to protecting a personal computer system and its user from fraudulent information-gathering activity commonly known as phishing. More particularly, the invention is directed to automatic development of phishing detection rules based on the use of existing rules.

BACKGROUND OF THE INVENTION

Thanks to the rapid development of Internet technologies over the last decade, the affordability of a large variety of Internet-connectable devices (such as personal computers, notebooks, tablets, smartphones, etc.), and their ease of use, a great number of people have come to rely on the World-Wide Web for their daily activities, such as consuming media content, shopping, working with bank accounts, reading mail, texts, or other forms of messaging, visiting social networks, among many other uses. Often, when working on the Internet (for example, when purchasing products, transferring money, registering with retailers or service providers, etc.), users are asked to provide certain confidential information (such as credit card numbers and bank account numbers, account passwords, etc.), all of which are examples of information upon which the financial security of users depends, to external sites.

The sheer number of users of the Internet has drawn a massive increase in the activity of fraud perpetrators who, by various techniques and methodologies, seek to gain access to confidential data of users in order to misappropriate personal and financial data to engage in fraudulent or other malicious activity. One of the more popular methods employed by fraudsters is commonly referred to as phishing, i.e. gaining access to confidential user information through electronic messaging by masquerading as a known or trusted entity, e.g., popular brands, personal messages within various services (for example, within social networks), and creation and registration with search services of sites posing as legitimate sites of banks, Internet stores, social networks, etc. A letter or message sent to users by fraudsters often contains links to malicious sites which look familiar, and often quite similar, to real ones, or to sites from which a transfer to malicious sites will be made. Once the user is transferred to a fake page, fraudsters, using various social engineering techniques, try to cause the user to enter his/her confidential information, which the fraudster then uses to access corresponding user accounts and bank accounts. In addition to the extraction of confidential information, the user is exposed to the risk of receiving, from a fake site, a malicious application that works unbeknownst to the user to gather various other items of information from the victim's computer and transfer it to fraudsters.

To counter the above-described fraud method, technologies are used to detect phishing messages (for example, in email) and fake sites. These technologies use databases of trusted and non-trusted site addresses, templates of sentences and other text strings from known phishing messages, etc. When the presence of such a suspicious object is detected, the user is informed about the potential danger.

Although these existing techniques may be efficient when dealing with already-known threats, links and pages, that have been studied by information security specialists and have been recognized as potentially dangerous, the conventional techniques are much less efficient when dealing with new, constantly-changing threats. In addition, because of a manual or semi-automatic analysis, the response time between the appearance of a new phishing site or message and its detection and subsequent blockage from access by a user can be quite significant, which represents a major factor in the large number of users succumbing to phishing and related fraud.

A practical solution is therefore needed to address the ever-changing nature of phishing attacks.

SUMMARY OF THE INVENTION

One aspect of the invention is directed to automatically developing detection rules for detecting phishing content in incoming data. This aspect is embodied in a system and a method, and in variations thereof. In summary of these embodiments, incoming data directed to a destination is obtained. Any indicia of phishing that may be present in the incoming data is detected, with the detecting being performed by application of a plurality of phishing detection rules. A quantitative score for each of a plurality of predefined parameters is determined, with each of the parameters relating to at least one of the phishing indicia, and each quantitative score representing a likelihood of a presence of phishing content in the incoming data for the at least one of the phishing indicia.

Further, a requirement is assessed for evolving a phishing detection rule by applying a predefined set of rule evolution criteria to a combination of the determined quantitative scores of a plurality of parameters. In response to an assessment of the requirement for evolving a phishing rule, a new phishing detection rule is generated based on selected parameter scores meeting the rule evolution criteria and on corresponding content of the phishing indicia relating to those selected parameter scores. The phishing indicia and quantitative score computation is performed recursively based on the new detection rules, as are further assessment of the requirement for rule evolution and generation of new detection rules.

Any phishing-related objects are identified based on selected parameter scores exceeding a phishing detection threshold and on corresponding content of the phishing indicia relating to those selected parameter scores. As a result, the content relating to the phishing-related objects in the incoming data can be modified to remove or reduce maliciousness of the phishing-related objects.

BRIEF DESCRIPTION OF THE DRAWINGS

The invention may be more completely understood in consideration of the following detailed description of various embodiments of the invention in connection with the accompanying drawings, in which.

Figure 1A:
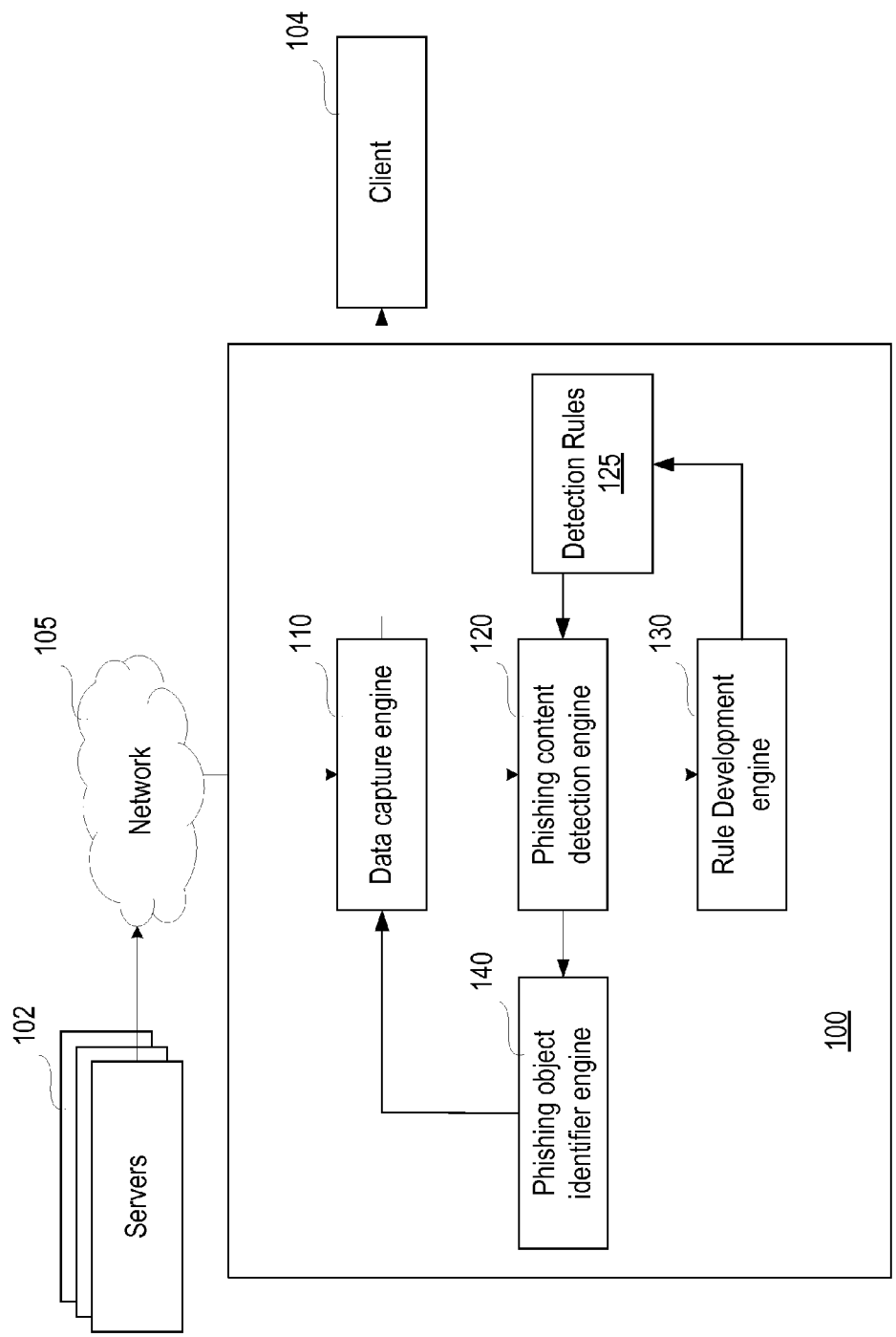
FIG. 1A is a block diagram illustrating a system for selectively building, and evolving, rules for detecting phishing indicia in the data sent from a server to a client, according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Computing platform," "Computer," and "Computer system"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computing platforms can be stand-alone devices, or embedded devices that are part of a larger device or system.

"Data capture"—Obtaining of data being sent to a designated destination by an entity, such as a driver or proxy, that is not the designated destination.

"Data storage"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Driver"—An engine or component that acts like a translator between a device, such as a disk drive, and programs that use the device, such as the operating system shell. The driver ordinarily accepts generic commands from a program and then translates them into specialized commands for the device.

"Engine"—A real-world device, component, or arrangement of components implemented using hardware, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of software-controlled hardware. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. In addition, a engine can itself be composed of more than one sub-engines, each of which can be regarded as a engine in its own right.

"Evolution," "Evolving" of phishing detection rules—Computationally-creation of new phishing detection rule(s) based on application of existing phishing detection rules. Evolution of phishing detection rules can, as an example, create successive generations of rules, i.e., with new rules created from application of previously-evolved rules.

"Interception"—Reading and capturing data by an intermediary process or device, the data being directed to a destination, thereby holding that data from proceeding until the intercepted data is released. While being held, the intercepted data can be re-directed, altered, dropped, delayed, or otherwise acted upon by the intermediary process or device.

"Network interface device"—A type of input/output device that facilitates communication of information to an external computing device over a computer network. Examples include an Ethernet port, a Wi-Fi radio interface, a Bluetooth™ interface, etc.

"Object"—A piece of software code, or data structure, e.g., text or graphic, stored in computer hardware. Examples include files, programs, data packets, etc.

"Parameter score"—a computationally-derived measure of a characteristic, property, factor, element, or some combination thereof. As an example in the context of phishing indicia, a parameter (for which a score is computed) can relate to one or more individual phishing indicia. For instance, a parameter can represent the presence of a particular phishing indicator in a set of data. As another example, a parameter can represent a count of various phishing indicia in a set of data. In general, a parameter represents a measure of the strength of the phishing detection, and is also indicative of the specific items of phishing content.

"Phishing"—A malicious attempt to acquire confidential information from a victim, such as access credentials, financial account details, personal information or the like, by masquerading as a trustworthy entity in an electronic communication.

"Process virtual machine"—a virtual machine designed to run a single program, which means that it supports a single process. Such virtual machines are usually closely suited to one or more programming languages and built with the purpose of providing program portability and flexibility. Examples include Java Virtual Machine, .Net Framework, Parrot Virtual Machine.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Proxy," "Proxy server," "Proxy service"—An intermediary engine running on a local computer system or on a distinct computer system or network device (e.g., switch, router, etc.), that functions as an intermediary between an application of the local (client) computer system that access a remote computer (e.g., a server) over a computer network. A proxy can additionally assist with establishing connections between the local and remote computer systems, and can provide a variety of data processing operations for the benefit of the local computer system. Data flow is passed through the proxy, which can monitor, filter or modify, and redirect the data packets as needed according to the beneficial service to be provided by the proxy. For instance, to protect users working on local computer systems, a proxy can analyze the connections to network addresses, and block or redirect network traffic if a connection is suspected of exposing the user's computer system to undue risk (such as the transfer of phishing content—as pertinent to the present invention). Another example of further data processing operations performed by a proxy is storing copies of frequently-used Web pages (caching) to provide faster loading of those pages.

"Means for obtaining incoming data directed to a destination"—Data capture engine 110 or interceptor engine 112 according to any one (or combination of) each of their various embodiments described below, or any of each of their structural equivalents.

"Means for detecting any indicia of phishing" and "Means for determining a quantitative score for each of a plurality of predefined parameters"—Phishing content detection engine 120 according to any one (or combination of) each of their various embodiments described below, or any of each of their structural equivalents.

"Means for assessing a requirement for evolving a phishing detection rule," "Means for evolving a phishing rule," "Means for generating a new phishing detection rule," and "Means for recursively performing detecting indicia of phishing, determining quantitative scores, assessing a requirement for evolving rules, and evolving a phishing rule"—Rule development engine 130 according to any one (or combination of) each of their various embodiments described below, or any of each of their structural equivalents.

"Means for identifying any phishing-related objects"—Phishing object identifier engine 140 according to any one (or combination of) its various embodiments described below, or any of its structural equivalents.

"Means for modifying content relating to the phishing-related objects in the incoming data to remove or reduce maliciousness of the phishing-related objects"—Modification engine 116 according to any one (or combination of) its various embodiments described below, or any of its structural equivalents.

II Description of Preferred Embodiments

Aspects of the present invention can be implemented as part of a computer system programmed to become a special-purpose machine, or as a combination of special-purpose machines. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1A is a block diagram illustrating system 100 for selectively building, and evolving, rules for detecting phishing indicia in the data sent from a server 102 to a client 104, according to one embodiment. In general, system 100 works as an intermediary in a server-client arrangement in which one or more servers 102 exchange data with a client 104 via the network 105 and to provide the client with access to certain resources or services. The following are examples of servers 102:

Websites (for example, the site of a bank or of an Internet store);
    file servers;
    instant messaging services (for example, Skype);
    operating system services (for example, file loading services).

Network 105 is facilitates the exchange of data between servers 102 and client 104. The following are examples of such a network:

a local area network;
    a wide-area network;
    the Internet;
    a defined subset of the Internet.

The client 104 receives data from the server 102, processes the received data, and displays the result of the processing to the user. Client 104, in various examples, can be implemented as:

a browser application;
    a mail client;
    any one of the instant messaging service clients (for example, Skype, QIP);
    electronic document viewing engines.

In one type of embodiment, system 100 is built to operate automatically, meaning that system 100 performs its principal functionality autonomously, i.e., without operator intervention. It will be understood that various other embodiments may facilitate user control or input of varying degree, with remaining functionality and decision-making handled in automated fashion under program control. The selective aspect of the operation of system 100 means that rules are built and evolved in response to the satisfaction of rule evolution criteria.

As depicted in the example embodiment of FIG. 1A, system 100 is configured to monitor communications between servers 102 and client 104 that are facilitated via network 105 such as the Internet. System 100 performs a number of functions, as described in detail below, the most basic of which is to detect the presence phishing content in the data sent from one or more servers 102 to client 104, and to respond to the detected presence of phishing content. For example, the response can be to remove the phishing content altogether, flag the phishing content, or otherwise render the phishing content benign. In the embodiment depicted in FIG. 1A, system 100 has an architecture that includes data capture engine 110, a phishing content detection engine 120, a rule development engine 130, and a phishing object identifier engine 140.

Each of these engines is constructed, programmed, configured, or otherwise adapted, to autonomously carry out a function or set of functions. The term engine as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular autonomous functionality, which (while being executed) transform the microprocessor system into a special-purpose machine. An engine can also be implemented as a combination of the two, with certain functions facilitated by hardware alone, and other functions facilitated by a combination of hardware and software. In certain implementations, at least a portion, and in some cases, all, of an engine can be implemented using the processor(s) of one or more computers that execute an operating system, system programs, and application programs, while also implementing the engine (and thereby becoming a special-purpose machine). An engine can be implemented using multitasking, multithreading, distributed (e.g., cluster, peer-peer, cloud, etc.) processing where appropriate, or other such techniques. Accordingly, each engine can be physically realized in any of a variety of suitable physical and logical configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 1B:
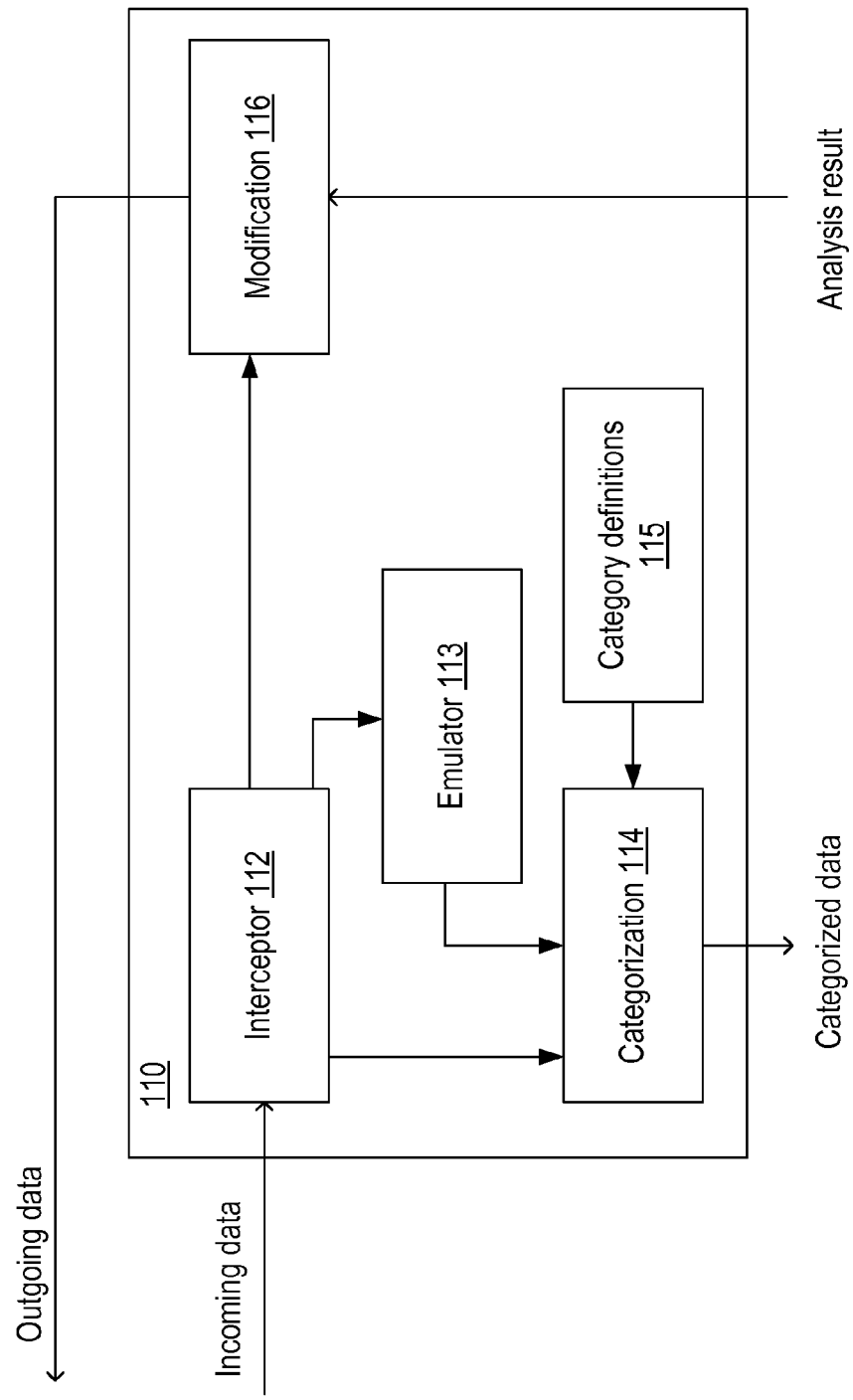
FIG. 1B is a block diagram illustrating details of a data capture engine depicted as part of the system of FIG. 1A.

The data capture engine 110 is composed of several sub-engines according to one embodiment, as depicted in FIG. 1B. Interceptor engine 112 is programmed, or otherwise configured, to intercept incoming data that is sent from the server 102 to the client 104. Interception of the incoming data involves preventing the incoming data from reaching its destination and storing the incoming data for processing prior to releasing the incoming data, which may be modified as a result of the processing, to its destination.

Emulator engine 113 is programmed, or otherwise configured, to execute any code that may have been intercepted by interceptor engine 112 in an isolated environment such as a process virtual machine, for example, and to pass the outputs of that execution as additional data items part of the intercepted data to categorization engine 114. The additional data items can be html or text content, image files, animations, etc.

Categorization engine 114 is programmed, or otherwise configured, to categorize the intercepted data (including data items produced as the results of the emulation) into one or more predefined categories 115 of content, to be further processed as described below. Modification engine 116 is programmed, or otherwise configured, to selectively remove, change, or flag, or otherwise render benign, any detected phishing content from the data being sent to client 104, and transfer the modified data to client 104 (labeled as outgoing data in FIG. 1B) in lieu of the incoming data.

The following are examples data that may be intercepted:
html code of websites;
flash applications, java applets, or other code that is downloaded from sites;
multimedia data (for example, images contained on sites or screenshots of the client's operation);
electronic documents (Microsoft Office documents, portable document format (PDF) documents, etc.);
email messages.

In various embodiments, data capture engine 110 can be implemented as:
a proxy (for example, a proxy server configured for interception of http traffic);
a driver installed on a user computer (for example, a disk access driver for intercepting access of files).

A proxy is an intermediary engine running on a local computer system or on a distinct computer system or network device (e.g., switch, router, etc.), that functions as an intermediary between an application of the local (client) computer system that access a remote computer (e.g., one of servers 102) over a computer network 105. A proxy can additionally assist with establishing connections between the local and remote computer systems, and can provide a variety of data processing operations for the benefit of the local computer system. Data flow is passed through the proxy, which can monitor, filter or modify, and redirect the data packets as needed according to the beneficial service to be provided by the proxy. For instance, to protect users working on local computer systems, a proxy can analyze the connections to network addresses, and block or redirect network traffic if a connection is suspected of exposing the user's computer system to undue risk (such as the transfer of phishing content—as pertinent to the present invention). Another example of further data processing operations performed by a proxy is storing copies of frequently-used Web pages (caching) to provide faster loading of those pages.

A driver is an engine or component that acts like a translator between a device, such as a disk drive, and programs that use the device, such as the operating system shell. The driver ordinarily accepts generic commands from a program and then translates them into specialized commands for the device. In embodiments where data capture engine 110 is implemented as a driver, the driver additionally performs the data interception functionality.

The following are examples of the categories 115 into which the contents of intercepted items of data can be categorized:
hyperlinks;
multimedia data;
scripts (for example, Javascript or VBA);
text;
java applets;
flash applications.
In an
As an illustrative example, one of the components of an antivirus product that is responsible for countering unwanted advertising, working as a proxy server, performs categorization of the html code of an intercepted page by separately highlighting, e.g., tagging, grouping, or sorting, the items of content into a data structure, etc., text contained on the page, links to images, and flash applications present on the page, hyperlinks to other pages, etc.

The following examples are contemplated techniques executed by modification engine 116 for modification of intercepted data according to various related embodiments:
replacement of hyperlinks to sites performing fraudulent activity with warnings;
deactivation, on pages, of control elements initiating the sending of personal user data;
addition of flags or other information containing warnings;
partial or complete removal of phishing-related information.

For example, one of the components of an antivirus product responsible for countering phishing, upon detection on a non-trusted hyperlink on a user-visited page, can replace its html code with a text insert, so that the browser to which the relevant data will be sent shows, instead of the non-trusted hyperlink, a warning about the blockage of a potential threat (for example, replacing the code <a href="http://fakebank.com">CitiBank</a> with the code <b>[Link blocked]</b>).

With reference to FIG. 1A, phishing content detection engine 120 is programmed, or otherwise configured, to search for any known (i.e., predefined) indicia of phishing in categorized data, calculate values of certain parameters relating to phishing indicia found as a result of the search, and send the parameters and their calculated values, as well as the categorized data to the rule development engine 130 and phishing object identifier engine 140.

One, or a combination, of the following detection rules 125 can be used in searching for indicia of phishing according to one or more embodiments:
- determination of the size of the categorized text;
- search, in the text, for tokens from a token dictionary which represent messages about phishing, and calculation of their quantity;
- reception of site attributes (IP address, owner, etc.) to which the categorized hyperlinks refer;
- comparison of the similarity of categorized multimedia data with non-trusted or trusted multimedia data.

According to various embodiments, the following are examples of phishing indicia, as recognized by detection rules 125 according to various embodiments:
- text length below a specified threshold (for example, less than 20 words) on a site page or in a message;
- a non-trusted hyperlink (i.e., pointing to a non-trusted site or address);
- an unknown link to images from a known organization's site;
- a number of tokens in a text string longer than a specified threshold (for example, over 20% of words and sentences of the text match tokens from the dictionary, where the dictionary contains tokens representing phishing messages);
- image of a trusted logo together with a non-trusted or unknown link;
- text length larger than a specified threshold (for example, over 1000 words) when there are no images or links;
- multiple large images without text;
- a domain not belonging to the organization;
- a link to an image not referring to the organization's domain;
- combinations of the above-mentioned indicia.

Each of the parameters relates to one, or a combination, of phishing indicia, and can take additional circumstantial information into account, such as categorization. The following are examples of parameters relating to phishing indicia for which a quantitative score can be computed according to one or more embodiments:
- weighting factors for phishing indicia;
- weighting factors for categories;
- phishing indicia detection flags;
- category detection flags;
- number of phishing indicia by categories.

An example of phishing parameter quantitative score calculation according to one embodiment is an assignment, by one of the components of an antivirus product responsible for countering phishing, of a weighting factor for an unknown link contained in the site under investigation (for example, from 0.0, corresponding to a trusted link, to 1.0, corresponding to a non-trusted link) To determine the weighting factor, the presence of the link in the list of trusted links is checked (if the link is found, a weighting factor of 0.0 is assigned, and the calculation is stopped); the presence of the link in the list of non-trusted links is checked (if the link is found, a weighting factor of 1.0 is assigned, and the calculation is stopped); a match of one of the tokens from the non-trusted link token dictionary is checked (if the token is found, the weighting factor to be found is increased by 0.25); it is checked whether the site owner is in the list of non-trusted owners (if the owner is found, the weighting factor to be found is increased by 0.15), etc.

Figure 1C:
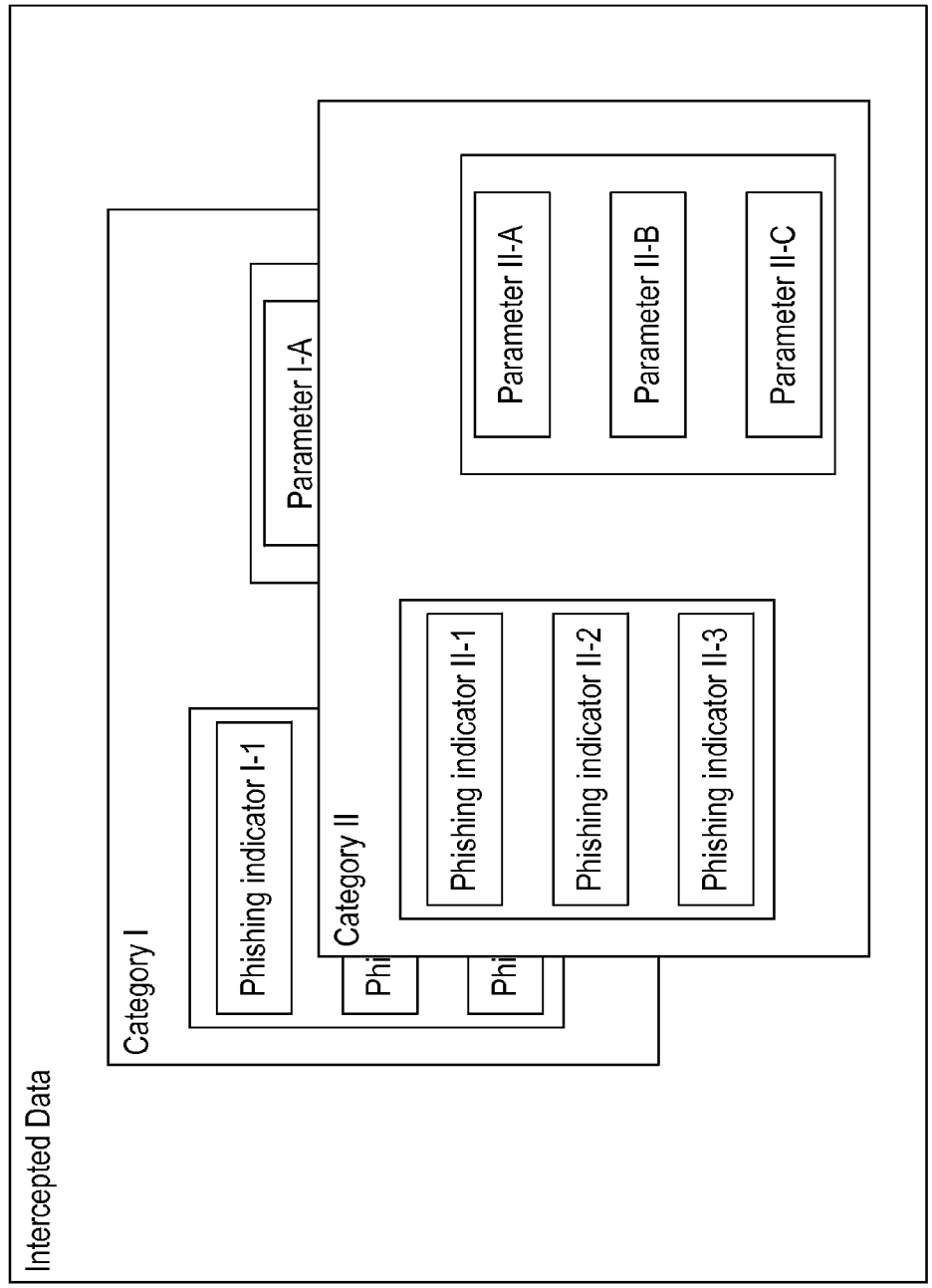
FIG. 1C is a diagram illustrating the relationships between categories of data among intercepted data content, phishing indicia, and computed parameters, as realized by embodiments of the invention.

FIG. 1C is a diagram illustrating the relationships between the categories of data among the intercepted data content, phishing indicia, and computed parameters. The intercepted data can contain multiple categories of content. For example, text, images, browser-executable objects, etc. Various categories can be represented in the same set of received data, such as a Web page.

In FIG. 1C, two categories are depicted, Category I, and Category II. Each category is associated with a corresponding set of phishing indicia. Accordingly, for Category II, phishing indicators II-1, II-2, and II-3 are shown. Similarly, there are multiple different phishing indicia for Category I. The phishing indicia between categories can be similar or quite different, with their comparative similarities corresponding to the comparative nature of the different categories. Each category also corresponds to a set of parameters that are specific to the category.

As depicted, Parameters II-A, II-B and II-C correspond to category II; whereas a separate set of parameters will correspond to Category I. The parameters may have a one-to-one, many-to-one, or one-to-many correspondence with the phishing indicators for the same category, and these relationships can vary considerably between the specific instances of phishing indicators, parameters, and between categories.

According to the embodiments described herein, the computed parameter values represent a scoring of the strength of the phishing detection, and are also indicative of the specific items of phishing content.

Rule development engine 130 is programmed, or otherwise configured, to make a decision as to evolving rules for searching for phishing content and rules for ascertaining the presence of phishing content in intercepted data. In the present context, the evolution of rules means automatic generation of new rules based on the application of previous rules. In a related embodiment, rules are evolved under program control without requiring new incoming data. In other words, the application of existing rules to the same items of data can produce successive generations of detection rules that are capable of gaining new and deeper insight into phishing-related content that may be present in the same data.

The phishing object identifier engine 140 is programmed, or otherwise configured, to identify (e.g., flag, tag, place in data structure, etc.) phishing-related objects that can lead to exposing the user to phishing content, and items of phishing content themselves.

Examples of identifiable phishing-related objects include:
- non-trusted hyperlinks;
- multimedia data containing phishing content;
- the position and size of text blocks containing information determined to be phishing;
- portions of html code responsible for transfer of user data to the server.

The following example describes operation of system 100 and its interaction with servers 102 and client 104. The context in which system 100 operates includes a user, interacting with a browser application, having found, via a search service, a site selling products that the user is interested in purchasing. After the transfer to the provided address, the user's browser is directed to the ordering page, where, among other information, the user is asked to enter his/her credit card information. In this example, this site is a phishing site created by fraudsters in order to steal credit card information.

Once the user, via the browser 104, has entered the phishing site, the information, in the form of html code, is sent from the site to the browser 104. On the user's computer, or on a proxy server, the data from the site is intercepted by the data capture engine 110.

The data capture engine 110 intercepts the data represented in the form of html code intended for the browser 104, and categorizes the content of the intercepted html code. In one such embodiment, data capture engine 110 first performs an emulation in an isolated computing environment (such as a virtual machine) of the html code, including the following:

execution of the scripts contained in the html code (for example, scripts in the JavaScript language decoding the data contained in the html code, such as hyperlinks, texts, etc.);

loading of multimedia data called from the html code (for example, images of the logo of the bank which the site pretends to represent);

loading of flash applications, java applets, etc., called from the html code;

emulation of user actions (for example, entering text into entry fields and pressing buttons in order to determine the subsequent actions);

rendering of the page to a memory clipboard or file for subsequent use together with other multimedia data for search for phishing indicia.

After the completion of the emulation, the data capture engine 110 directly performs categorization of the emulated data itself and sends the received categorized data (such as text, hyperlinks, images, etc.) to the phishing content detection engine 120.

Later, upon receiving from the phishing object identifier engine 140 the phishing-related objects present in the intercepted data (for example, non-trusted hyperlinks found in the data), modification engine 116 of data capture engine 110 performs modification of the intercepted html code (for example, replacing the detected non-trusted hyperlinks with text warnings about possible phishing), and then sends the modified html code to the browser 104.

The phishing content detection engine 120 performs a search for categorized phishing indicia data (for example, presence of hyperlinks of non-trusted sites, phrases in the text that are typically used on phishing sites, discrepancies between the hyperlink names and the addresses to which they lead, presence of logos of well-known companies among images, etc.). Further, phishing content detection engine 120 calculates a quantitative score based on the parameters of the phishing indicia returned in the search results (for example, in the case of a string of text, the score can be the weighting factor, indicating the probability of belonging to phishing; in the case of hyperlinks, the score can be a flag indicating non-trusted links, etc.). The calculated parameter scores and categorized data is passed to the rule development engine 130 and to phishing object identifier engine 140.

The rule development engine 130, on the basis of the received phishing indicia parameter scores, selectively evolves rules for determining the presence of phishing. Such rules can be based on a combination of parameters, with parameter values defined for detection thresholds (for example, a rule by which the presence of non-trusted links and of a weighting factor of the text containing non-trusted links exceeds 0.75 (where 0.0 means a trusted link, and 1.0 means a non-trusted link), is considered as a positive phishing detection result). Selective phishing detection rule evolution is described in greater detail below.

Newly-generated phishing detection rules are recursively applied to the intercepted data to determine additional parameters and their quantitative values, and to determine the need for any further rule evolution.

Phishing object identifier engine 140 processes the intercepted data in the context of the detected phishing indicia, the and the computed parameter scores to apply phishing object detection criteria and, ultimately, to determine which items of content of the intercepted data constitute objects that relate to phishing. These objects may be phishing content itself, or hyperlinks to phishing content that will be found elsewhere. The criteria for phishing object detection can be the same or similar to criteria for rule evolution according to one type of embodiment. In another embodiment, the criteria for phishing object detection differs (for instance, the phishing object threshold can be set to be higher—i.e., more selective—than the threshold for evolving a detection rule in order to reduce the likelihood of responding to a false positive). Once collected, the phishing-related objects are passed to data capture engine 110 to be modified.

Data capture engine 110, upon receiving a listing of the identified phishing-related objects, finds, and modifies, those objects in the intercepted data to remove, alter, or otherwise render the detected phishing content benign.

The browser 104, having received a modified html code, processes it and displays it in its window. As a result, a user, even when transferred to a phishing site, is limited in his/her capability to use it, and is thereby protected from a loss of his/her confidential data, such as bank card information.

Another exemplary application of system 100 relates to the analysis of data transferred from a server to a client where the server is a mail client and the client is a mail client application that reads electronic mail. One of the received emails was sent by fraudsters in order to lure the user to a specially created site. Once the user, using a mail client 104, has opened the letter received from the mail server 102, information in the form of a pdf document is sent by the mail server 102 to the mail client 104. On the user's computer, or on a proxy server, the data from the mail server 102 are intercepted by the data capture engine 110.

The data capture engine 110 intercepts the data intended for the mail client 104, presented in the form of a pdf document, categorizes them and sends the received categorized data (such as text, hyperlinks, images, etc.) to the phishing content detection engine 120.

The phishing content detection engine 120 performs a search of the categorized data for phishing indicia, and calculates their parameter scores based on the found phishing indicia. The parameter scores and categorized data are provided to the rule development engine 130 and to the phishing object identifier engine 140.

The rule development engine 130, on the basis of the received parameters of the phishing indicia, selectively evolves rules for determining whether phishing is present (for example, a rule by which the presence of images from a non-trusted list together with text with a weighting factor over 0.9 (where a weighting factor of 0.0 means a trusted image, while a weighting factor of 1.0 means a non-trusted image) is considered as meeting the criteria for evolving a detection rule).

As in the previous example, phishing object identifier engine 140 analyzes the results of the application of the phishing detection rules, e.g., finds the cause(s) of the high parameter scores exceeding a phishing detection threshold, and identifies the phishing-related objects that constituted those causes, and identifies those objects in a suitable manner (e.g., tagging, compiling a list, etc.) Thereafter, phishing object identifier engine 140 passes the phishing-related objects identifications to data capture engine 110 for modification.

Then, upon receiving the phishing-related object identifications (for example, certain text strings, images, code, etc.) from the phishing object identifier engine 140, the data capture engine 110 modifies the intercepted pdf document (for example, by adding text warnings about possible phishing to the pdf document); then, it sends the modified pdf document to the mail client 104.

The mail client 104, having received the modified pdf document, processes it and displays it in its window. As a result, the user, when viewing the received letter, sees a warning about possible phishing in its content.

Figure 2:
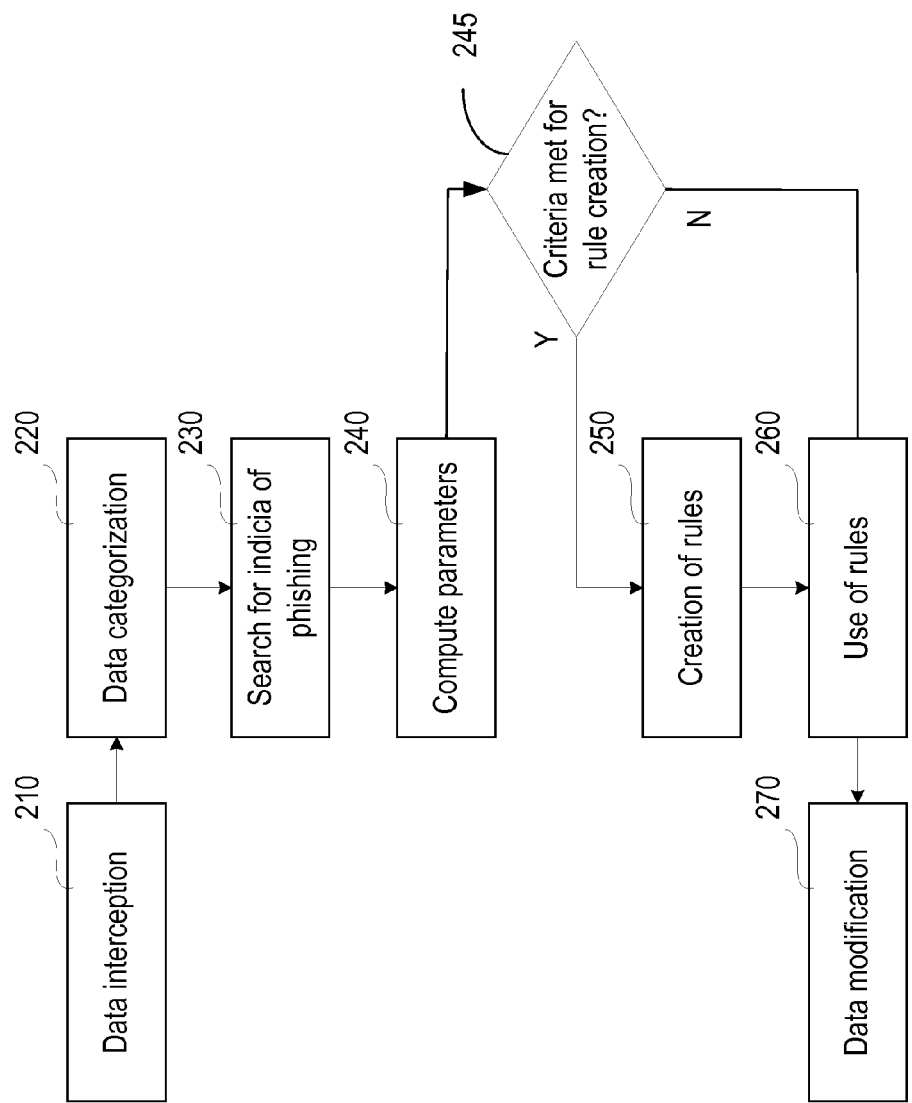
FIG. 2 is a flow diagram illustrating an exemplary overall process flow according to one embodiment.

FIG. 2 is a flow diagram illustrating an exemplary overall process flow according to one embodiment. The exemplary method includes data interception 210, data categorization 220, search for phishing indicia 230, calculation of parameter scores 240, selective evolution of rules 250, the use of rules 260 and data modification 270.

At stage 210, the data transferred by the servers 102 to the client 104 are intercepted. The intercepted data can include any of the exemplary types of data described above. At stage 220, the intercepted data are categorized by criteria, such as according to the category examples described above. At stage 230, the categorized data are searched for indicia of phishing. At stage 240, parameters and values thereof, of the detected phishing indicia are calculated. Thereafter, at 245, a decision is made about the suitability of evolving rules for detecting phishing content on the basis of the calculated parameter values.

If the rule evolution criteria is satisfied, then the process advances to stage 250, where phishing detection rules are generated on the basis of the calculated phishing indicia parameters. If the rule creation criteria is not satisfied, new rules are not created, and the set of existing rules is used to perform the phishing content detection at stage 260.

At stage 260, the generated rules are applied to the categorized data, a search is performed for data used in phishing, and the parameters of detected phishing content are calculated.

At stage 270, the intercepted data are modified on the basis of the calculated parameters of the data used in phishing, and the modified data are sent to the client 104.

In a related embodiment, evolution of phishing detection rules includes re-categorization of the intercepted data in order to apply phishing detection rules for other categories of data content to the data. This approach improves phishing detection sensitivity and leads to the generation of new and better detection rules. For example, if the intercepted data contained images, those images were initially categorized in the multimedia data category, but later, using image-to-text recognition algorithms, the data are re-categorized as text, with all of the text-category-based detection rules now being applicable.

Rules are evolved so as to setup logical links between the found phishing indicia on the basis of the calculated parameters (for example, an image with the logo of a well-known company is a factor which increases the weighting factor of an unknown hyperlink, up to a level where the hyperlink starts to be considered as non-trusted).

Also, when evolving the rules, previously-obtained rules can be used, which will complicate (increase the number of logical links between phishing indicia) or simplify (decrease this number, respectively) the rule being built. The phishing indicia that is found, as well as the parameters calculated on their basis, and the rules subsequently built for the purpose of further use for new categorized data, can be saved either locally, on a user computer, or remotely, in a cloud (in this case, they can be downloaded by other users and used on other computers as well).

One of the methods for building rules is the use of a neural network, which can learn to build new more accurate rules on the basis of parameters received during the processing of previously received data. In such a neural network, neurons are represented by algorithms (or, in other words, processes) of calculation of phishing indicia and of calculation of phishing indicia parameters, which mutually exchange categorized data and calculated parameters. Various learning methods can be used, for example, supervised learning, where some neurons (i.e. phishing indicia calculation methods) and some links (i.e. what phishing indicia and indicia parameters the neurons accept) are determined by an analyst on the basis of previously-processed data. In another embodiment, an unsupervised learning method can be used, where the neurons reorganize depending on previously processed data without involving an analyst in the analysis process. As a result of the operation, the above-described neural network can return either the fact of use of processed data for phishing, or the probability of such a fact (from 0 to 1, where 0 means trusted data, while 1 means non-trusted data).

Figure 3A:
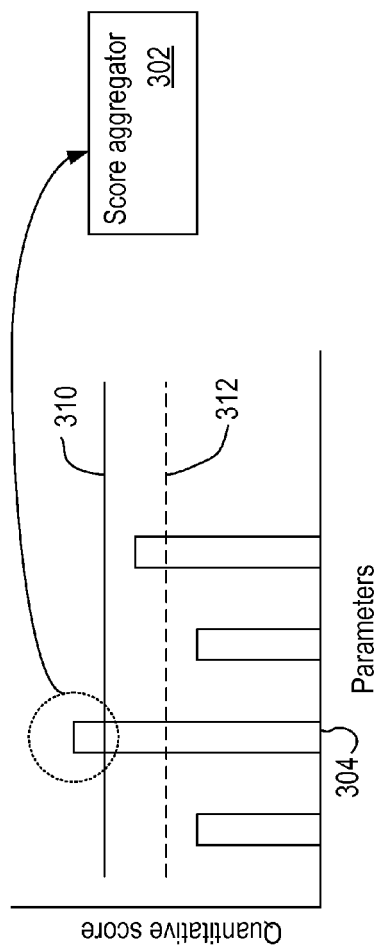
FIGS. 3A and 3B depict an exemplary approach according to related embodiments, in which one, or a combination, of parameter values are taken into account in making the determination as to whether new rules should be generated.
Figure 3B:
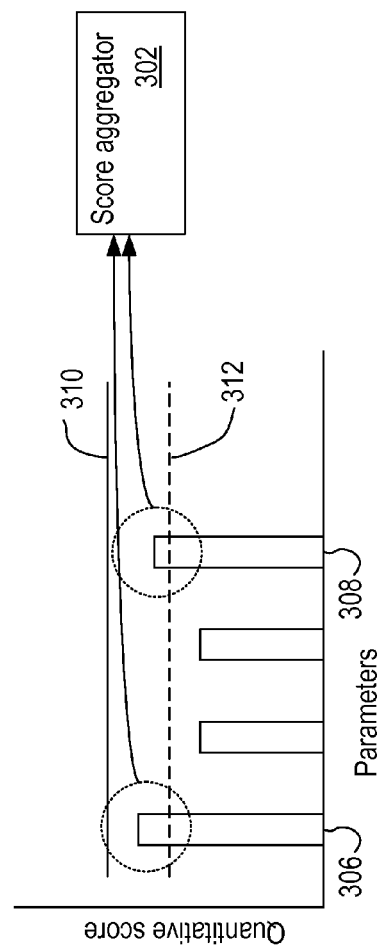

In one embodiment, evolution of phishing detection rules includes first determining whether the prevailing conditions merit the generation of new rules based on the application of previous rules. FIGS. 3A and 3B depict an exemplary approach according to related embodiments, in which one, or a combination, of parameter values are taken into account in making the determination as to whether new rules should be generated. This approach is facilitated by score aggregator engine 302, which is implemented as part of rule development engine 130. Score aggregator module is programmed, or otherwise configured, to compare parameter values against multiple thresholds.

The following are examples of operations by rule score aggregator module for determining whether to create new phishing detection rules:
- at least one of the phishing indicia parameter's quantitative score exceeds a first specified rule evolution threshold 310; or
- the combined value of at least two phishing indicia parameters' quantitative scores exceeds a second specified rule evolution threshold 312.

FIG. 3A illustrates the first case, in which the value of parameter 304 exceeds higher threshold 310. In this basic case, threshold 310 can also correspond to a positive phishing detection, i.e., indicative of there being content believed to be phishing content. In response to threshold 310 being exceeded by parameter 304, new detection rule generation is initiated. In generating new phishing detection rules, not only is parameter 304 taken into account, but the other parameters are taken into account as well.

In the new detection rules being generated, various different weightings can be applied to the different parameters according to a related embodiment. In one such embodiment, the relative weights at least roughly correspond to the relative parameter valuations.

FIG. 3B illustrates another case. Here, no parameter value exceeds threshold 310. However, two of the parameters, indicated at 306 and 308, exceed lower threshold 312. In this example, threshold 312 does not correspond to a positive phishing detection for any given parameter; however, score aggregator 302 is configured with criteria that recognizes an indication for new rule generation based on an aggregated combination of the parameters that exceed threshold 312. Therefore, new rule generation is initiated.

In related embodiments, the aggregated value of phishing indicia parameters can be calculated by score aggregator 302 according to various other combining techniques. For instance:
- computing a sum, product, or other aggregation of the quantitative scores of the phishing indicia parameters (e.g., all of the parameters, or only a subset of parameters that exceed some threshold such as lower threshold 312);

computing a measure of a prevailing trend among phishing indicia parameters;

computing an indicator of diffusion of phishing indicia parameters in relation to their mathematical expectation.

Figure 4:
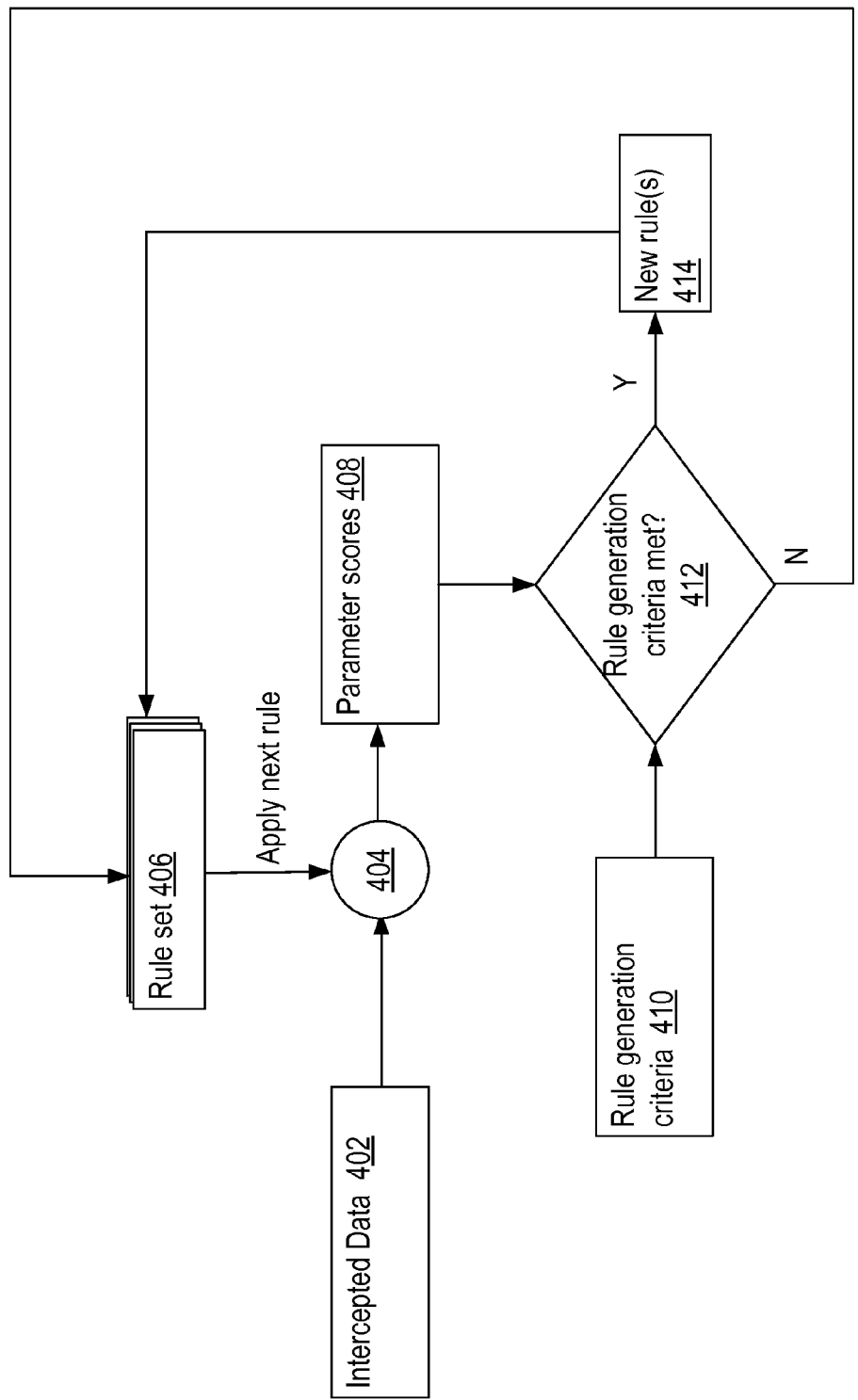
FIG. 4 is an information flow diagram illustrating a process for evolving phishing detection rules according to one embodiment.

FIG. 4 is an information flow diagram illustrating a process for evolving phishing detection rules according to one embodiment. As depicted, intercepted data 402, as obtained by the interceptor engine 112 of data capture engine 110, for instance, is examined at 404 according to rule set 406, which includes existing phishing detection rules. The examination of the intercepted data 402, according to embodiments described above, includes categorization of the data, application of category-specific phishing detection criteria, and parameter scoring. The result of the processing produces parameter scores 408.

These parameter scores are compared against rule generation criteria 410, as indicated at 412, which renders a decision as to whether or not to evolve the phishing detection rules. This decision 412 is based on one or more of the decision criteria discussed above, for example. If the rule generation criteria 410 is met by parameter scores 408, then the process proceeds to evolve one or more new phishing detection rules 414. The new rule(s) 414 are then added to rule set 406, and are re-applied to the intercepted data 402.

Notably, in this example, the newly-evolved rules that are added to rule set 406 are used to examine intercepted data 402 for indicia of phishing and for generating new parameter scores 408. Thus, the process of this example uses a recursive technique to create multiple successive generations of phishing detection rules without requiring human input or fresh incoming data from which to create the new rules. Rather, the phishing detection rule evolution (in a broad sense) looks at the varying parameters and their values to assess the sensitivity of certain detection rule features, and to select the more sensitive rule features from which to spawn variations of the detection rules. As exemplified above, these rule variations can develop new rules across categories based on the success of a given rule in a prior rule generation's category.

Figure 5:
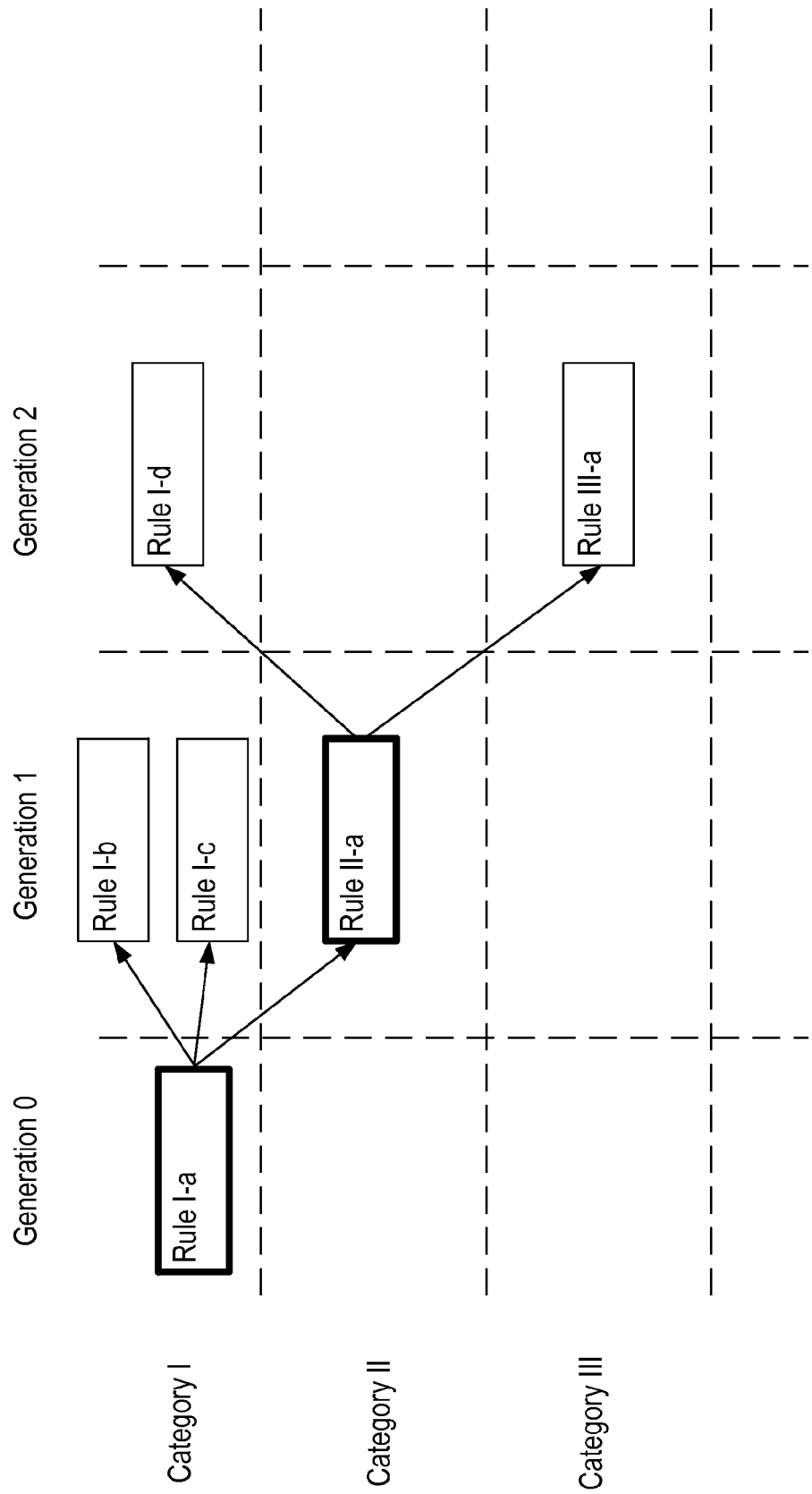
FIG. 5 is a rule evolution diagram illustrating an example of how an initial rule is evolved to form successive generations of rules applicable to different categories of content according to one embodiment.

FIG. 5 is a rule evolution diagram illustrating an example of how an initial rule is evolved to form successive generations of rules applicable to different categories of content according to one embodiment. In FIG. 5, three categories of content are represented by rows labeled Category I, Category II, and Category III. Each of the columns represents a generation of rule evolution. These are labeled Generation 0, Generation 1, and Generation 2. In the example depicted, an initial rule of Generation 0, Rule I-a, which is applicable to Category I, is applied to a set of intercepted data. The processing of the detection rule's application to the set of intercepted data resulted in a decision to evolve the rule. For example, one or more parameter scores exceeded an applicable at least one threshold (e.g., as exemplified above with reference to FIGS. 3A and 3B).

The rule creation process created rules in subsequent Generation 1. These are Rule I-b and Rule I-c (applicable to Category I), as well as Rule II-a (applicable to Category II). Each of the newly-generated rules are applied to the intercepted data, which in one embodiment can include the very same intercepted data to which the previous generation's rule was applied. Of these three Generation 1 rules, Rule II-a has met the decision criteria for evolving a subsequent generation of rules. Accordingly, Rule 1-*d*, and Rule III-a of Generation 2 are created. In various other examples, it is possible for multiple rules to meet the decision criteria, in which each of these multiple rules will have further generations of rules evolved.

Returning to the present example, each of the new Generation 2 rules is in a different category than Rule II-a from which they were evolved. This can represent a real-world example in which a first detection rule being developed to detect a particular ASCII text string (and perhaps also certain variations thereof) (e.g., of a first category of content) previously identified as constituting phishing content, is evolved to detect non-ASCII-encoded text appearing as part of an image file (e.g., of a second category of content) that, when character-recognized and converted into ASCII text, would constitute the particular text string (or variations) that constitutes phishing content. A similar rule evolution can be applied to a piece of browser-executable code (e.g., a third category of content) that renders text or an image of the text in a browser application, that can constitute the same phishing content.

The Generation 2 rules are then applied to the intercepted data to further examine rule evolution opportunities. Rule evolution can continue for further generations until the rule evolution criteria fails to be met by all of the applied rules of the latest generation, or there may be a prescribed limit to the number of generations. In a related embodiment, the rule generation thresholds can be incrementally increased for successive generations such that increasingly particularly sensitive detections are preferentially selected for evolution in later generations.

As another example of evolving rules across different categories, new categories can be generated. For example, a first category can apply to a flash object, having been identified as meeting rule evolution criteria. In response, the rule evolution process examines the various elements within the flash object, e.g., AcrionScript elements, textual elements, images, etc., and for each of these, a new category is automatically defined and explored in subsequent iterations.

Figure 6:
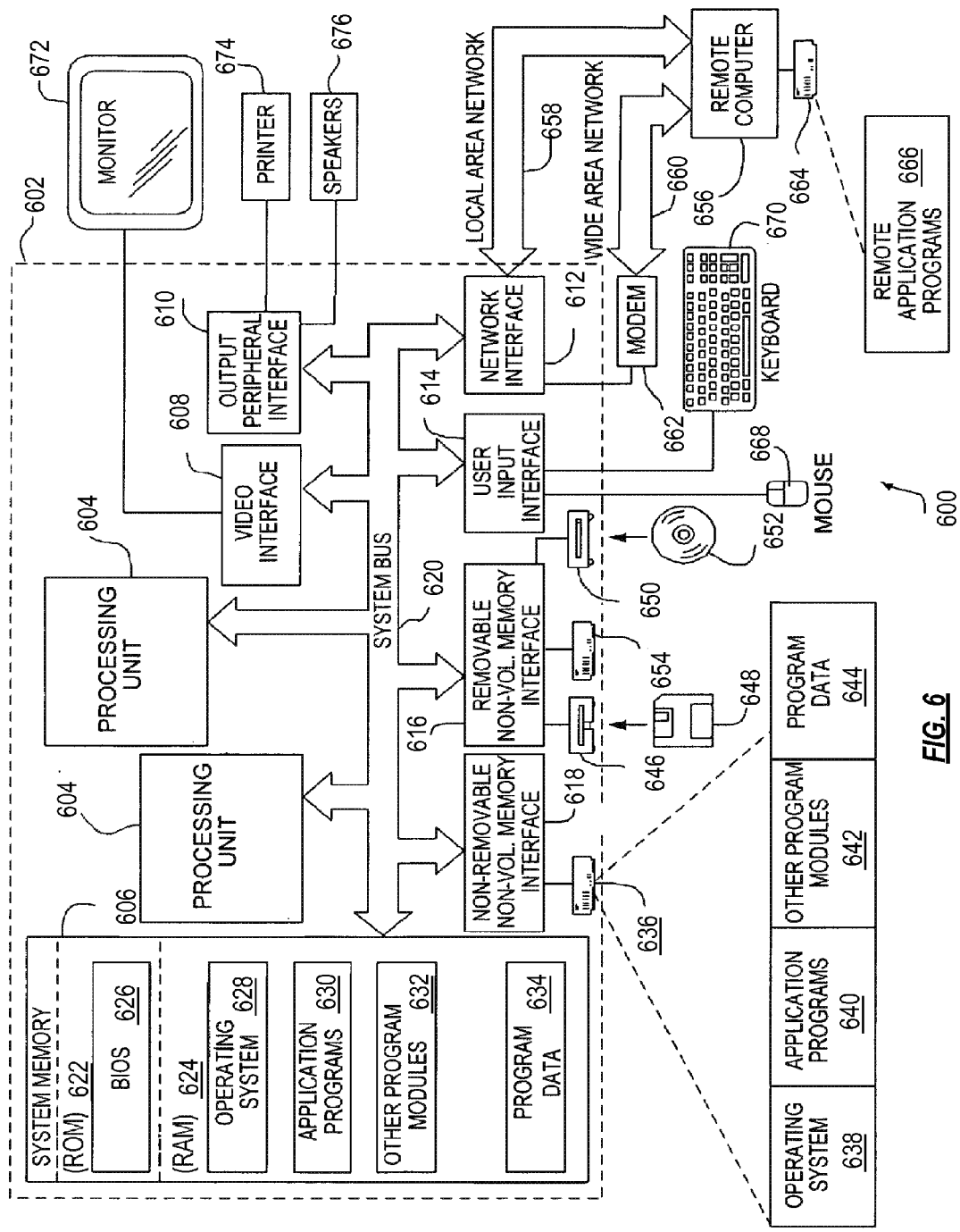
FIG. 6 is a diagram illustrating a computer system that is made into a special-purpose machine with improved functionality upon implementation of aspects of the invention as described herein.

FIG. 6 is a diagram illustrating in greater detail a computer system 600, that is made into a special-purpose machine with improved functionality upon implementation of aspects of the invention as described herein. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program engines 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as SSD or rotational disk drives. These disk drives 636 may provide further storage for various software applications such as the operating system 638, application programs 640 and other program engines 642. Further, the disk drives 636 may store other information such as program or application data 644. In various embodiments, the disk drives 636 store information that doesn't require the same low-latencies as in other storage mediums. Further, the operating system 638, application program 640 data, program engines 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing system that includes a processor, data storage, and input/output devices including a network interface device, a method for automatically developing detection rules, the method comprising:
   (a) obtaining, by the computing system, incoming data directed to a destination;
   (b) detecting, by the computing system, any indicia of phishing present in the incoming data, the detecting being performed by application of a plurality of phishing detection rules;
   (c) computationally determining, by the computing system, a quantitative score for each of a plurality of predefined parameters, each of the parameters relating to at least one of the phishing indicia, and each quantitative score representing a likelihood of a presence of phishing content in the incoming data for the at least one of the phishing indicia;

(d) assessing, by the computing system, a requirement for evolving a phishing detection rule, including applying a predefined set of rule evolution criteria to a combination of the determined quantitative scores of a plurality of parameters;

(e) in response to an assessment of the requirement for evolving a phishing rule, generating, by the computing system, a new phishing detection rule based on selected parameter scores meeting the rule evolution criteria and on corresponding content of the phishing indicia relating to those selected parameter scores;

by the computing system, recursively performing (b)-(e) based on any new phishing detection rules having been evolved in (e);

identifying, by the computing system, any phishing-related objects based on selected parameter scores exceeding a phishing detection threshold and on corresponding content of the phishing indicia relating to those selected parameter scores;

modifying, by the computing system, content relating to the phishing-related objects in the incoming data to remove or reduce maliciousness of the phishing-related objects.

2. The method of claim 1, wherein in obtaining the incoming data, the destination to which the incoming data is directed is a remote client computer system.

3. The method of claim 1, wherein obtaining the incoming data includes intercepting incoming data prior to arrival of the incoming data at the destination.

4. The method of claim 1, wherein detecting any indicia of phishing present in the incoming data includes emulating, in an isolated computing environment, any code that is present in the incoming data.

5. The method of claim 1, further comprising:
categorizing, by the computing system, items of content of the intercepted data into a plurality of predefined categories representing different types of content, wherein each category is associated with a corresponding set of the parameters.

6. The method of claim 5, wherein generating a new phishing detection rule includes re-categorizing certain items of content of the intercepted data into other categories, and applying phishing detection rules for those other categories to those certain items of content.

7. The method of claim 1, wherein in computationally determining the quantitative score for each of the parameters, at least one quantitative score represents a result of application of a combination of different phishing detection rules to detect a related combination of phishing indicia.

8. The method of claim 1, wherein the rule evolution criteria includes a first rule evolution threshold against which the combination of the determined quantitative scores are applied.

9. The method of claim 8, wherein the first rule evolution threshold is different from the phishing detection threshold.

10. The method of claim 8, wherein the first rule evolution threshold is the same as the phishing detection threshold.

11. The method of claim 8, wherein the rule evolution criteria includes a second rule evolution threshold against which the combination of the determined quantitative scores are applied, the second rule evolution threshold being lower than the first rule evolution threshold, wherein the rule evolution criteria is met when any individual quantitative score of the combination exceeds the first rule evolution threshold, and wherein the rule evolution criteria is independently met when a specified plurality of quantitative scores of the combination exceeds the second rule evolution threshold.

12. The method of claim 1, wherein the rule evolution criteria includes a rule evolution threshold against which the an aggregation of the determined quantitative scores of the combination are applied.

13. The method of claim 1, wherein in recursively performing (b)-(e), multiple successive iterations of (b)-(e) are performed, and wherein each new phishing detection rule is applied to the same incoming data from a previous iteration.

14. A system for automatically developing detection rules for detecting phishing content, the system comprising:
a computing platform having a processor, data storage, and a network interface device the computing platform containing instructions that, when executed by the computing platform, cause the computing platform to implement:
a data capture engine configured to obtain incoming data directed to a destination;
a phishing content detection engine operatively coupled to the data capture engine and configured to detect any indicia of phishing present in the incoming data, the detection being based on application of a plurality of phishing detection rules, and to determine a quantitative score for each of a plurality of predefined parameters, each of the parameters relating to at least one of the phishing indicia, and each quantitative score representing a likelihood of a presence of phishing content in the incoming data for the at least one of the phishing indicia;
a rule development engine operatively coupled to the phishing content detection engine and configured to:
assess a requirement for evolving a phishing detection rule, based on application of a predefined set of rule evolution criteria to a combination of the determined quantitative scores of a plurality of parameters by the phishing content detection engine;
generate a new phishing detection rule based on selected parameter scores meeting the rule evolution criteria and on corresponding content of the phishing indicia relating to those selected parameter scores in response to an assessment of the requirement for evolving a phishing rule;
pass the new phishing detection rule to the phishing content detection engine to cause the phishing content detection engine to apply the new phishing detection rule to the incoming data;
recursively assess the requirement for evolving a phishing detection rule, and generate a new phishing rule in response to application of a new phishing detection rule to the incoming data;
a phishing content identifier engine operatively coupled to the phishing content detection engine and the rule development engine, and configured to identify any phishing-related objects based on selected parameter scores exceeding a phishing detection threshold and on corresponding content of the phishing indicia relating to those selected parameter scores; and
a modification engine configured to modify content relating to the phishing-related objects in the incoming data to remove or reduce maliciousness of the phishing-related objects.

15. The system of claim 14, wherein the destination to which the incoming data is directed is the computing platform.

16. The system of claim 14, wherein the data capture engine is part of a proxy.

17. The system of claim 14, wherein the data capture engine is implemented as part of a driver executing on the computing platform.

18. The system of claim 14, wherein the data capture engine includes an interceptor engine configured to intercept incoming data prior to arrival of the incoming data at the destination.

19. The system of claim 14, wherein the data capture engine includes an emulator engine configured to execute, in an isolated computing environment, any code that is present in the incoming data.

20. The system of claim 14, wherein the data capture engine includes a categorization engine configured to categorize items of content of the intercepted data into a plurality of predefined categories representing different types of content, wherein each category is associated with a corresponding set of the parameters.

21. The system of claim 20, wherein the rule development engine is configured to generate the new phishing detection rule in response to a re-categorization of certain items of content of the intercepted data into other categories, and application of phishing detection rules for those other categories to those certain items of content.

22. The system of claim 14, wherein at least one quantitative score represents a result of application of a combination of different phishing detection rules to detect a related combination of phishing indicia.

23. The system of claim 14, wherein the rule evolution criteria includes a first rule evolution threshold against which the combination of the determined quantitative scores are applied.

24. The system of claim 23, wherein the first rule evolution threshold is different from the phishing detection threshold.

25. The system of claim 23, wherein the first rule evolution threshold is the same as the phishing detection threshold.

26. The system of claim 23, wherein the rule evolution criteria includes a second rule evolution threshold against which the combination of the determined quantitative scores are applied, the second rule evolution threshold being lower than the first rule evolution threshold, wherein the rule evolution criteria is met when any individual quantitative score of the combination exceeds the first rule evolution threshold, and wherein the rule evolution criteria is independently met when a specified plurality of quantitative scores of the combination exceeds the second rule evolution threshold.

27. The system of claim 14, wherein the rule evolution criteria includes a rule evolution threshold against which the an aggregation of the determined quantitative scores of the combination are applied.

28. A computing system for automatically developing detection rules, the system comprising:
- means for obtaining incoming data directed to a destination;
- means for detecting any indicia of phishing present in the incoming data, the detecting being performed by application of a plurality of phishing detection rules;
- means for determining a quantitative score for each of a plurality of predefined parameters, each of the parameters relating to at least one of the phishing indicia, and each quantitative score representing a likelihood of a presence of phishing content in the incoming data for the at least one of the phishing indicia;
- means for assessing a requirement for evolving a phishing detection rule, including applying a predefined set of rule evolution criteria to a combination of the determined quantitative scores of a plurality of parameters;
- means for evolving a phishing rule, including means for generating a new phishing detection rule based on selected parameter scores meeting the rule evolution criteria and on corresponding content of the phishing indicia relating to those selected parameter scores;
- means for recursively performing detecting indicia of phishing, determining quantitative score s, assessing a requirement for evolving rules, and evolving a phishing rule based on any new phishing detection rules having been previously evolved;
- means for identifying any phishing-related objects based on selected parameter scores exceeding a phishing detection threshold and on corresponding content of the phishing indicia relating to those selected parameter scores; and
- means for modifying content relating to the phishing-related objects in the incoming data to remove or reduce maliciousness of the phishing-related objects.

* * * * *